US007486948B1

(12) United States Patent
Vergon

(10) Patent No.: US 7,486,948 B1
(45) Date of Patent: Feb. 3, 2009

(54) WIRELESS MAIL NOTIFICATION SYSTEM FOR A MAILBOX

(76) Inventor: Jacques Vergon, P.O. Box 11508, Glendale, CA (US) 91226

( * ) Notice: Subject to any disclaimer, the term of this patent is extended or adjusted under 35 U.S.C. 154(b) by 406 days.

(21) Appl. No.: 11/344,676

(22) Filed: Feb. 2, 2006

(51) Int. Cl.
*H04M 1/663* (2006.01)
*H04M 1/725* (2006.01)

(52) U.S. Cl. ............... 455/412.2; 455/412.1; 379/88.12

(58) Field of Classification Search .............. 455/412.2, 455/413; 379/88.12
See application file for complete search history.

(56) References Cited

U.S. PATENT DOCUMENTS 4,872,210 A 10/1989 Benages
5,023,595 A 6/1991 Bennett
5,440,294 A 8/1995 Mercier

*Primary Examiner*—Charles N Appiah
*Assistant Examiner*—Emem Stephen

(57) ABSTRACT

A wireless mail notification system includes a portable controller that is housed within a dwelling and is spaced from the mailbox. The portable controller includes a transceiver and is adaptable between on and off positions. A stationary housing is conjoined to a mailbox support shaft. The stationary housing is mounted exterior of the mailbox. The stationary housing includes a transceiver that is in wireless communication with the portable controller transceiver. A wireless mechanism is included for generating a true notification signal and a false notification signal, respectively, when the door of the mailbox has been opened such that the user understands whether mail has been delivered or retrieved after the door of the mailbox is opened.

9 Claims, 6 Drawing Sheets

WIRELESS MAIL NOTIFICATION SYSTEM FOR A MAILBOX

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to notification systems and, more particularly, to a wireless mail notification system for a mailbox.

2. Prior Art

Mail security is of increasing concern to many individuals and businesses. To prevent theft of checks, such as U.S. social security checks, dividend checks, etc., or to prevent loss or disclosure of confidential business information, there is often an urgent need for individuals or businesses to be alerted when mail delivery occurs. A signal system is particularly desirable for those locations where it is difficult or impossible to view the mailbox. However, with a timely, reliable signal, prompt action can be taken to pick up a mail delivery. For those with a long or physically difficult trip to the mailbox, such a system is also particularly desirable.

In addition, security of property is also of increasing concern to many individuals or businesses. For instance, in many rural areas, it would be desirable to provide a warning signal when fence gates or building doors are opened, so that prompt action can be taken to secure the areas against theft of animals, machinery, or other property. A number of devices for providing mail arrival signals have been identified.

One prior art example describes an early battery powered signal unit for mailboxes. Such a unit evidently requires periodic battery replacement. The apparatus is also quite bulky, and requires numerous separate attachments for both the batteries and the transmitter. The upwardly extending antenna is also an easy target for vandals. Additionally, the unit uses a pin-type activation switch, which is prone to adverse effects from wear and weather.

A further prior art example illustrates a battery powered signal transmitter and a remote receiver for use in indicating mail deposit. Such a device evidently operates in the frequency range used by garage door openers. Thus, it is often subject to spurious triggering. A pin-type switch is also utilized, which is prone to failure due to adverse effects just described above. Yet another example illustrates a mailbox which includes a mechanism responsive to opening of the door to trigger a transmitter, which sends a signal to a receiver to provide notice of mail delivery. Such an alarm system is not suitable for attachment to existing mailboxes; rather, this design is easily or economically practiced only by initial fabrication of a mailbox to incorporate the described actuator and switch mechanism.

Accordingly, a need remains for a wireless mail notification system for a mailbox in order to overcome the above-noted shortcomings. The present invention satisfies such a need by providing a wireless mail notification system that is convenient and easy to use, that is easily adapted to different mailboxes, and improves the safety and security of a person's mail. Such a notification system employs a motion sensor activator that is not subject to damage due to adverse weather conditions. Furthermore, the system can easily and quickly be installed by unskilled persons onto virtually any conventional mailbox. The notification system advantageously alerts a resident in real time that mail has been delivered to their mailbox. This allows the person to remove the mail in a timely fashion before can be intercepted by an unauthorized person.

BRIEF SUMMARY OF THE INVENTION

In view of the foregoing background, it is therefore an object of the present invention to provide a wireless mail notification system for a mailbox. These and other objects, features, and advantages of the invention are provided by a wireless mail notification system for a mailbox that notifies a user whether mail has been delivered or retrieved after a door of the mailbox has been opened.

The wireless mail notification system includes a portable controller that is housed within a dwelling and is spaced from the mailbox. Such a portable controller includes a transceiver. The portable controller is effectively adaptable between on and off positions. Such a portable controller preferably further includes a processor. A memory is electrically coupled to the processor. Such a memory includes software instructions that effectively cause the portable controller to automatically discontinue the audible signal when the mail has been retracted from the mailbox. An LED is electrically coupled to the processor for advantageously and conveniently providing a visual notification signal when the mail has arrived. A speaker and an amplifier are connected to the processor for increasing a voltage level of an output signal associated with notifying the user that mail has arrived.

A stationary housing is directly conjoined to a support shaft of the mailbox. Such a stationary housing is mounted exterior of the mailbox. The stationary housing includes a transceiver in wireless communication with the transceiver of the portable controller. Such a stationary housing may further include an internal power source and a switch operably connected directly thereto. The switch is automatically adaptable between open and closed positions based upon the instruction signal received by the timer circuit. An LED is electrically coupled directly to the processor and is selectively illuminable when the door of the mailbox is opened. A speaker and an amplifier are directly and electrically coupled to the processor wherein the amplifier intensifies the true and false notification signals before reaching the speaker so that the stationary housing conveniently provides an audible alert signal at the mailbox while the portable controller alerts the user inside the dwelling. The LED and the speaker are independently and simultaneously operable.

A wireless mechanism is included for generating a true notification signal and a false notification signal, respectively, when the door of the mailbox has been opened such that the user advantageously understands whether mail has been delivered or retrieved after the door of the mailbox is opened. The wireless mechanism preferably includes a processor that is situated within the housing. A timer circuit is electrically and directly coupled to the processor. Such a timer circuit is effectively triggered each time the door of the mailbox is opened wherein the timer circuit generates and transmits an instruction signal. A motion sensor is electrically and directly coupled to the processor. Such a motion sensor generates and transmits a unique signal when a door of the mailbox is opened and motion is detected inside the mailbox and the door of the mailbox is closed.

A memory is electrically coupled to the processor. Such a memory has software instructions that cause the wireless mail notification system to determine whether mail has been deposited into the mailbox or whether the door of the mailbox has been opened without depositing mail in the mailbox. The memory includes software instructions that perform a preprogrammed logic algorithm. Such an algorithm execute the steps of generating a first time signal when the door has been opened, generating a second time signal when mail has been placed into the mailbox, and generating a third time signal when the door has been closed after mail is placed into the mailbox and after a predetermined time interval has lapsed since the mail was placed in the mailbox.

Further steps include calculating whether a sum of the first, second and third time signals is greater than the predetermined time interval, generating and transmitting a false notification signal to the transceiver housed with the dwelling if the total time interval is less than the predetermined time interval, and generating and transmitting a true notification signal to the transceiver housed within the dwelling if the total time interval is greater than the predetermined time interval. The processor is advantageously able to determine whether mail was deposited into the mailbox after the door of the mailbox was opened and whether mail was not deposited into the mailbox after the door of the mailbox was opened to thereby accurately notify the user when mail has truly arrived.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
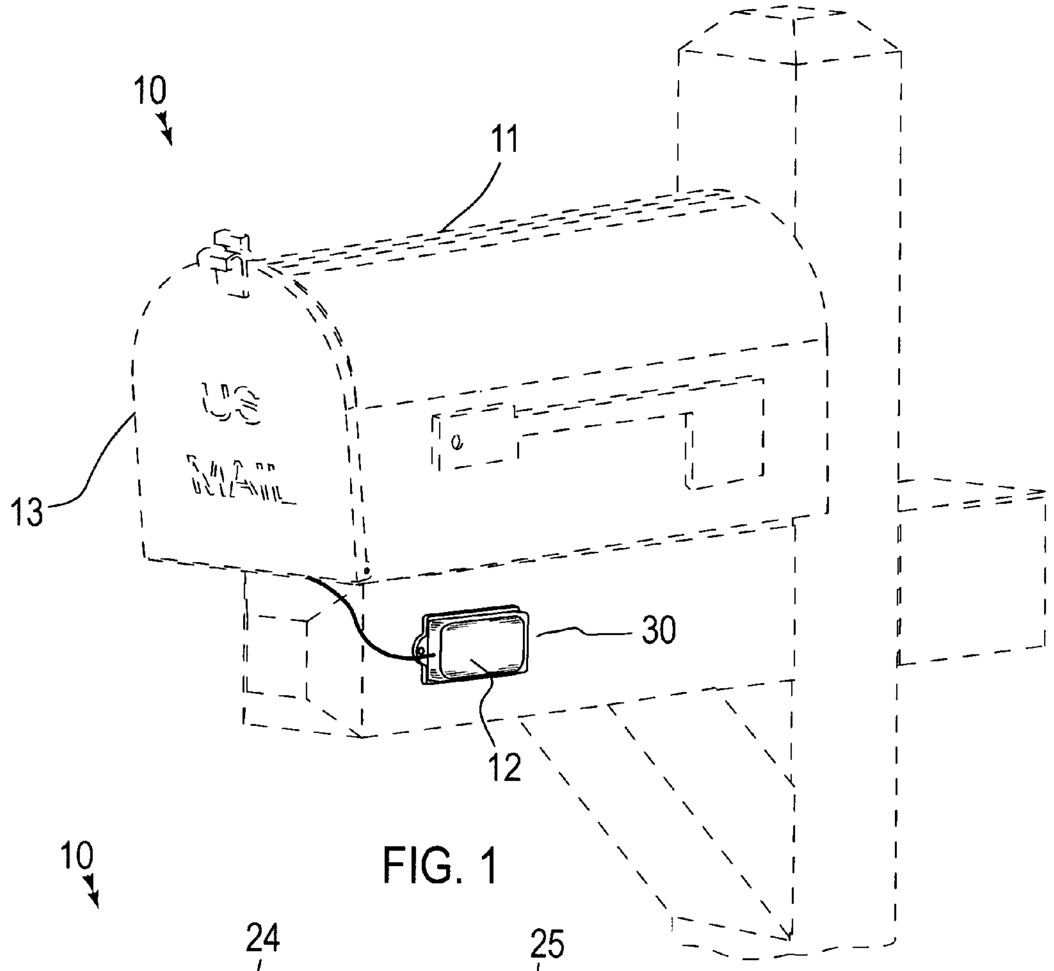
FIG. 1 is a perspective view showing the stationary housing attached to the mailbox support shaft, in accordance with the present invention.
Figure 2:
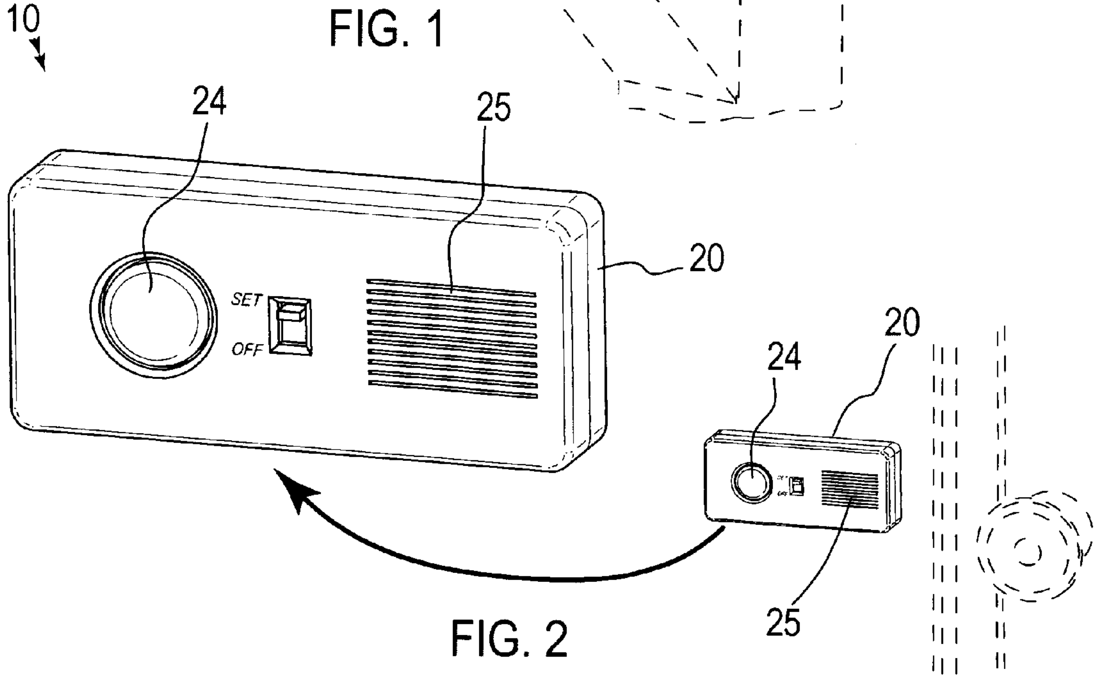
FIG. 2 is a perspective view showing the portable controller, in accordance with the present invention.
Figure 3:
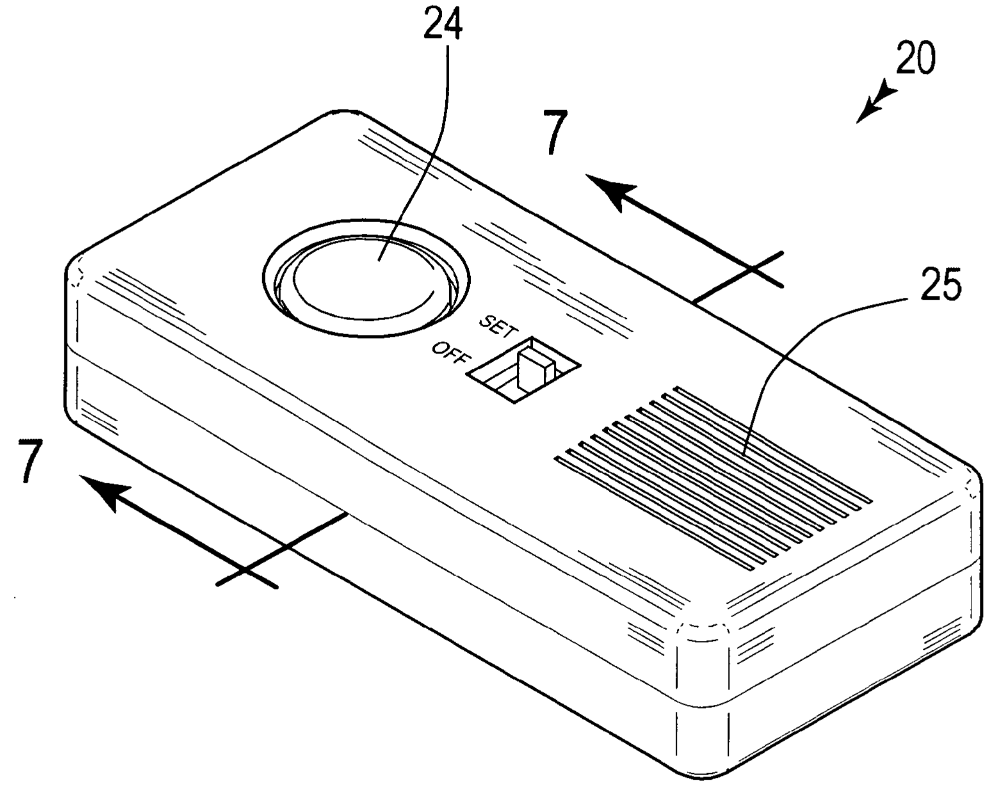
FIG. 3 is an enlarged perspective view of the portable controller shown in FIG. 2.
Figure 4:
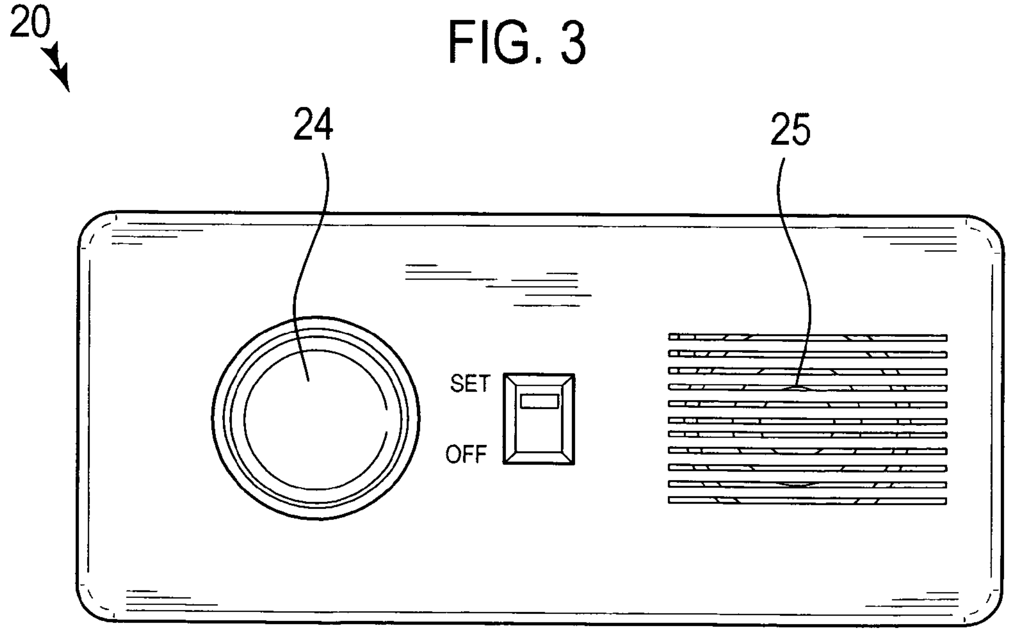
FIG. 4 is a top plan view of the portable controller shown in FIG. 3.
Figure 5:
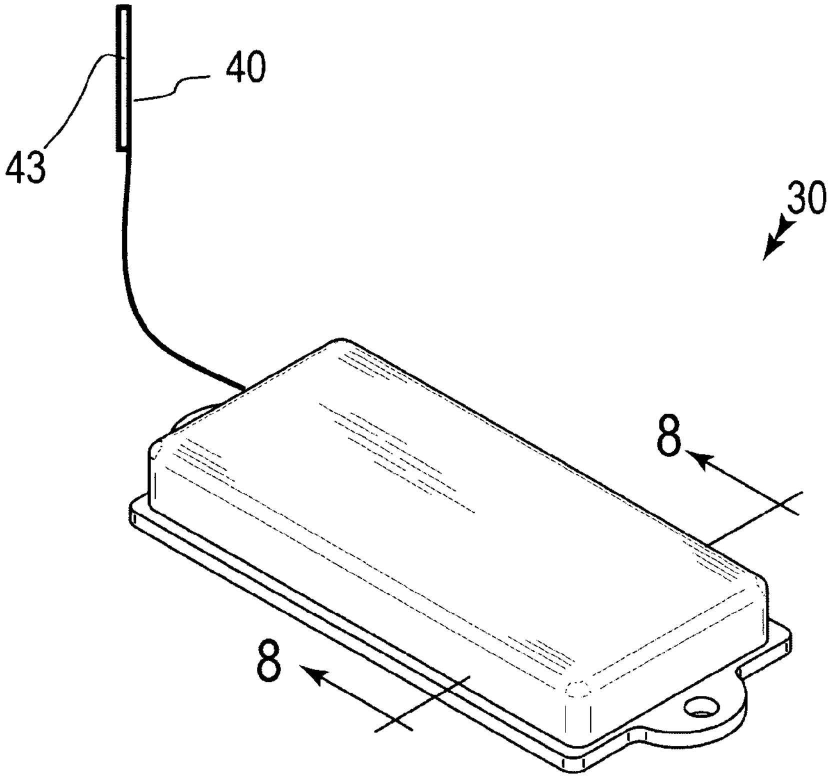
FIG. 5 is an enlarged perspective view of the stationary housing shown in FIG. 1.
Figure 6:
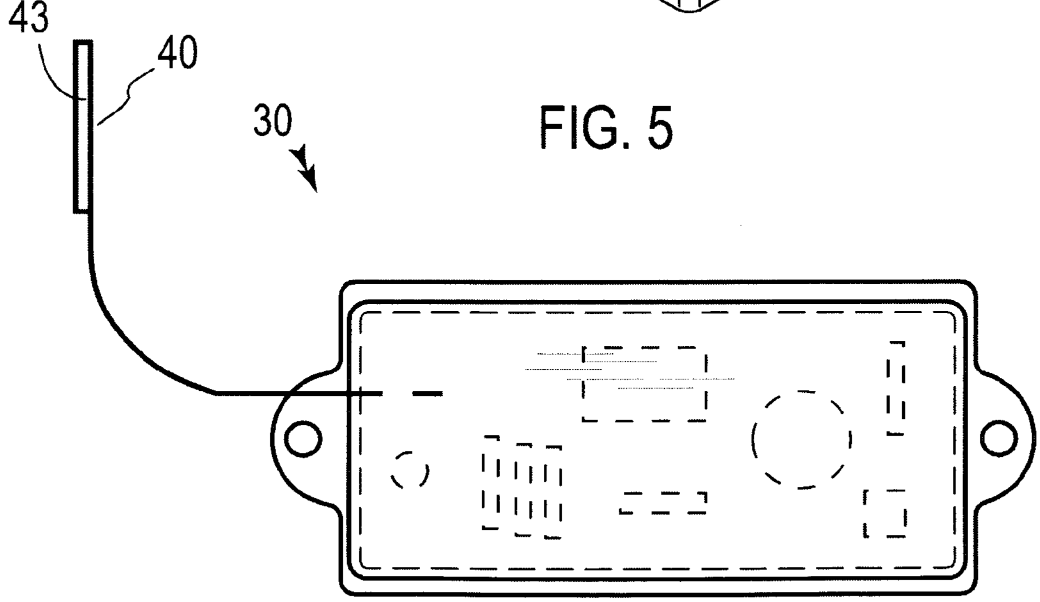
FIG. 6 is a top plan view of the stationary housing shown in FIG. 5.
Figure 7:
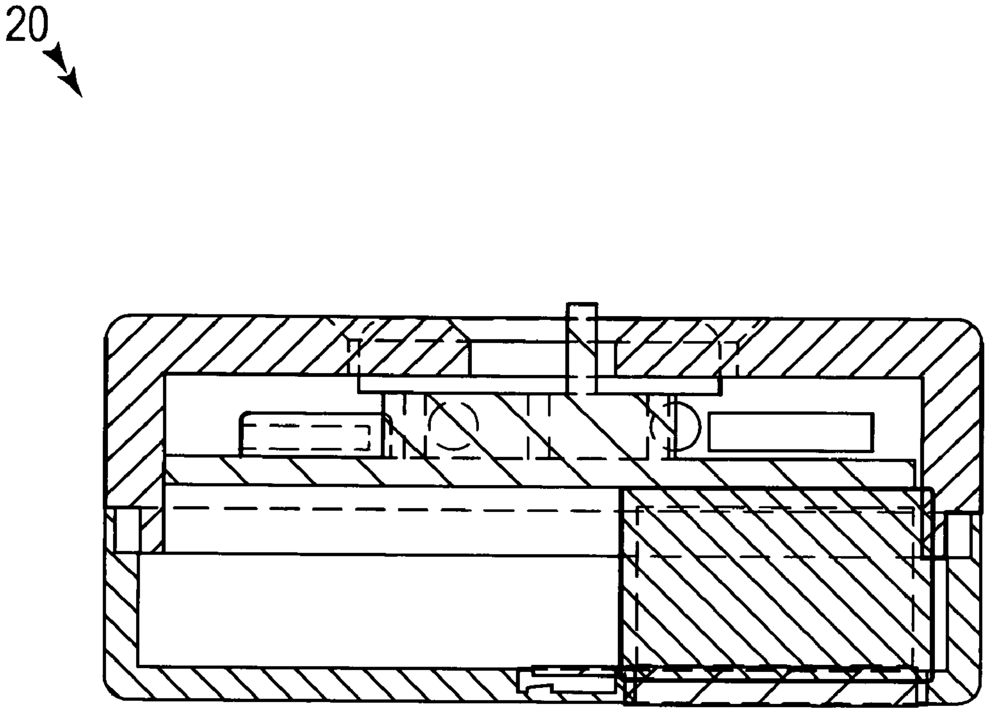
FIG. 7 is a cross-sectional view of the portable controller shown in FIG. 3, taken along line 7-7.
Figure 8:
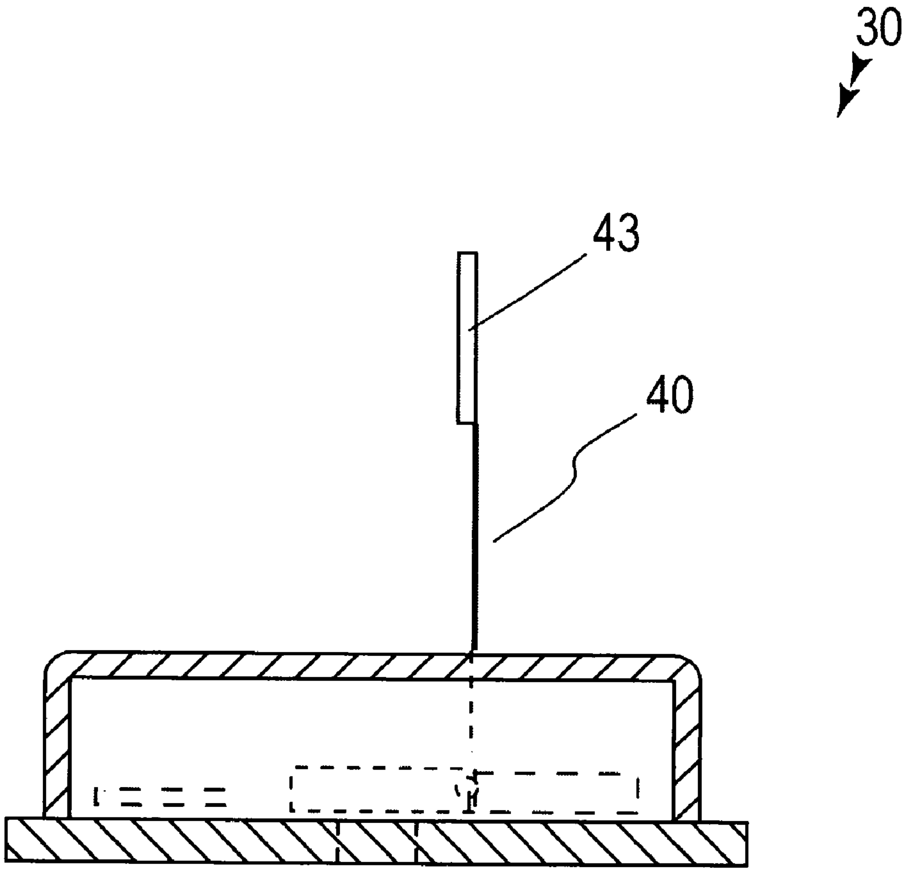
FIG. 8 is a cross-sectional view of the stationary housing shown in FIG. 5, taken along line 8-8.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-9 by the reference numeral 10 and is intended to provide a wireless mail notification system for a mailbox. It should be understood that the system 10 may be used to detect the arrival of many different types of items and should not be limited in use to only detecting the delivery/arrival of mail.

Referring initially to FIGS. 2, 3, 4, 7 and 9, the system 10 includes a portable controller 20 that is housed within a dwelling and is spaced from the mailbox 11. Of course, the portable controller 20 may be carried on one's person or may be positioned at a desired location within the dwelling, as is obvious to a person of ordinary skill in the art. Such a portable controller 20 includes a transceiver 21. The portable controller 20 is effectively adaptable between on and off positions, which is essential for allowing a user to conserve the power source 27 (described herein below) employed with the portable controller 20. Such a portable controller 20 further includes a processor 22.

A memory 23 is electrically coupled to the processor 22. Such a memory 23 includes software instructions that effectively cause the portable controller 20 to automatically discontinue the audible signal when the mail has been retracted from the mailbox 11, which is crucial for assuring the system 10 does not unnecessarily notify a person when mail has already been retrieved. An LED 24 is electrically coupled to the processor 22 that is important and advantageous for conveniently providing a visual notification signal when the mail has arrived. A speaker 25 and an amplifier 26 are connected to the processor 22 for increasing a voltage level of an output signal associated with notifying the user that mail has arrived.

An internal power source 27 is electrically and directly coupled, without the use of intervening elements, to the processor 22 for advantageously and effectively providing an operating power thereto. Of course, the processor 22 may be coupled to an internal or external reserve power source (not shown) if such a power source is available, as is obvious to a person of ordinary skill in the art.

Referring to FIGS. 1, 5, 6, 8 and 9, a stationary housing 30 is directly conjoined, without the use of intervening elements, to a support shaft 12 of the mailbox 11. Of course, the stationary housing 30 may be coupled to any other suitable surface in the vicinity of the mailbox 11, especially if a support shaft 12 is not present, as is obvious to a person of ordinary skill in the art. Such a stationary housing 30 is mounted to an exterior of the mailbox 11. The stationary housing 30 includes a transceiver 31 that is in wireless communication with the transceiver 21 of the portable controller 20, which is crucial for allowing the stationary housing 30 to wirelessly communicate with the portable controller 20 from a remote location. Such a stationary housing 30 further includes an internal power source 32 and a switch 33 operably connected directly thereto, without the use of intervening elements. Of course, the stationary housing 30 may be coupled to an internal or external reserve power source (not shown) if such a power source is available, as is obvious to a person of ordinary skill in the art.

The switch 33 is automatically adaptable between open and closed positions based upon the instruction signal received by the timer circuit 42 (described herein below). An LED 34 is electrically coupled directly, without the use of intervening elements, to the processor 41 (described herein below) and is selectively illuminable when the door 13 of the mailbox 11 is opened. A speaker 35 and an amplifier 36 are directly and electrically coupled, without the use of intervening elements, to the processor 41 wherein the amplifier 36 effectively intensifies the true and false notification signals before reaching the speaker 35 so that the stationary housing 30 conveniently provides an audible alert signal at the mailbox 11 while the portable controller 20 advantageously alerts the user inside the dwelling. The LED 34 and the speaker 35 are independently and simultaneously operable.

Figure 9:
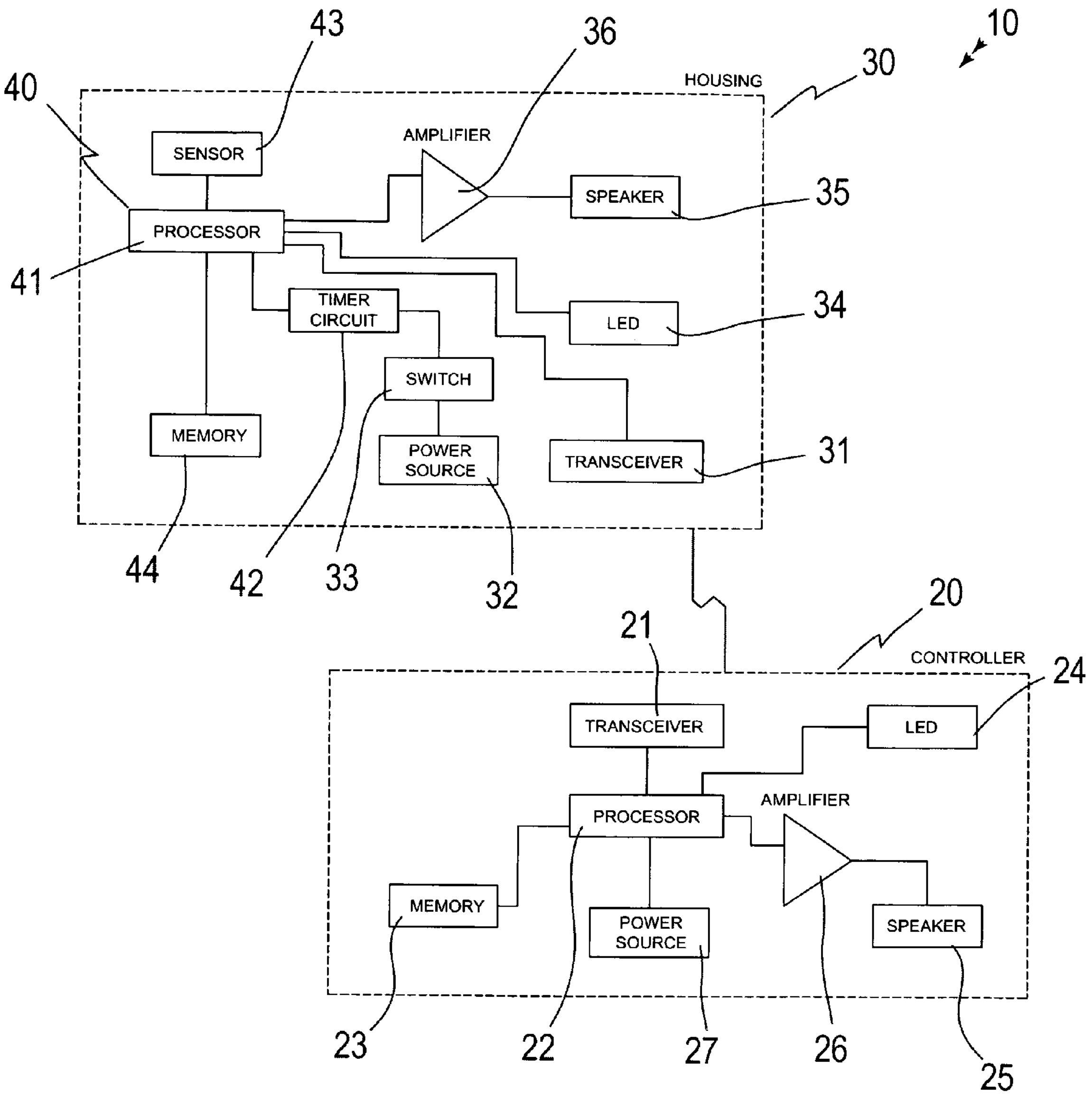
FIG. 9 is a schematic block diagram of the wireless mail notification system for a mailbox, in accordance with the present invention.

Referring to FIG. 9, a wireless mechanism 40 is included for effectively generating a true notification signal and a false notification signal, respectively, when the door 13 of the mailbox 11 has been opened such that the user advantageously understands whether mail has been delivered or retrieved after the door 13 of the mailbox 11 is opened. The wireless mechanism 40 includes a processor 41 that is situated within the housing 30. A timer circuit 42 is electrically and directly coupled, without the use of intervening elements, to the processor 41. Such a timer circuit 42 is effectively triggered each time the door 13 of the mailbox 11 is opened wherein the timer circuit 42 generates and transmits an instruction signal. A motion sensor 43 is electrically and directly coupled, without the use of intervening elements, to the processor 41. Such a motion sensor 43 generates and transmits a unique signal when a door 13 of the mailbox 11 is opened and motion is detected inside the mailbox 11 and the door 13 of the mailbox 11 is closed.

Still referring to FIG. 9, a memory 44 is electrically coupled to the processor 41. Such a memory 44 has software instructions that cause the wireless mail notification system 10 to determine whether mail has been deposited into the mailbox 11 or whether the door 13 of the mailbox 11 has been opened without depositing mail in the mailbox. The memory 44 includes software instructions that perform a preprogrammed logic algorithm. Such an algorithm execute the steps of generating a first time signal when the door 13 has been opened, generating a second time signal when mail has been placed into the mailbox 11, and generating a third time signal when the door 13 has been closed after mail is placed into the mailbox 11 and after a predetermined time interval has lapsed since the mail was placed in the mailbox 11.

Further steps include calculating whether a sum of the first, second and third time signals is greater than the predetermined time interval, generating and transmitting a false notification signal to the transceiver 21 housed with the dwelling if the total time interval is less than the predetermined time interval, and generating and transmitting a true notification signal to the transceiver 21 housed within the dwelling if the total time interval is greater than the predetermined time interval.

Such a control logic algorithm is critical and essential for the advantage of the present invention to be accurately obtained so that the use is aware of false alarms (when no mail is deposited in the mailbox after the door is opened). The processor 41 is advantageously able to determine whether mail was deposited into the mailbox 11 after the door 13 of the mailbox 11 was opened and whether mail was not deposited into the mailbox 11 after the door 13 of the mailbox 11 was opened, which is a critical feature for accurately notifying the user when mail has truly arrived.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A wireless mail notification system for a mailbox that notifies a user whether mail has been delivered or retrieved after a door of the mailbox has been opened, said wireless mail notification system comprising:

a portable controller housed within a dwelling and spaced from the mailbox, said portable controller including a transceiver;

a stationary housing directly conjoined to support shaft of the mailbox, said stationary housing including a transceiver in wireless communication with said transceiver of said portable controller; and wireless means for generating a true notification signal and a false notification signal, respectively, when the door of the mailbox has been opened such that the user understands whether mail has been delivered or retrieved after the door of the mailbox is opened;

when said wireless means comprises a processor situated within said housing;

a timer circuit electrically and directly coupled to said processor, said timer circuit being triggered each time the door of the mailbox is opened wherein said timer circuit generates and transmits an instruction signal;

a motion sensor electrically and directly coupled to said processor, said motion sensor generating and transmitting a unique signal when a door of the mailbox is opened and motion is detected inside the mailbox and the door of the mailbox is closed; and a memory electrically coupled to said processor, said memory having software instructions that cause said wireless mail notification system to determine whether mail has been deposited into the mailbox or whether the door of the mailbox has been opened without depositing mail in the mailbox, said memory including software instructions performing a preprogrammed logic algorithm executing the steps of:

a. generating a first time signal when the door has been opened, b. generating a second time signal when mail has been placed into the mailbox, c. generating a third time signal when the door has been closed after mail is placed into the mailbox and after a predetermined time interval has lapsed since the mail was placed in the mailbox, d. calculating whether a sum of said first, second and third time signals is greater than said predetermined time interval, e. generating and transmitting a false notification signal to said transceiver housed with the dwelling if said sum time interval is less than said predetermined time interval, and f. generating and transmitting a true notification signal to said transceiver housed within the dwelling if said sum time interval is greater than said predetermined time interval;

wherein said processor is able to determine whether mail was deposited into the mailbox after the door of the mailbox was opened and whether mail was not deposited into the mailbox after the door of the mailbox was opened to thereby accurately notify the user when mail has truly arrived.

2. The system of claim 1, wherein said stationary housing further comprises:

an internal power source and a switch operably connected directly thereto, said switch being automatically adaptable between open and closed positions based upon said instruction signal received by said timer circuit;

an LED electrically coupled directly to said processor and being selectively illuminable when the door of the mailbox is opened; and a speaker and an amplifier directly and electrically coupled to said processor wherein said amplifier intensifies said true and false notification signals before reaching said speaker so that the stationary housing provides an audible alert signal at the mailbox while said portable controller alerts the user inside the dwelling, said LED and said speaker being independently and simultaneously operable.

3. The system of claim 1, wherein said portable controller further comprises;

a processor;

a memory electrically coupled to said processor, said memory including software instructions that cause said portable controller to automatically discontinue said audible signal when the mail has been retracted from the mailbox;

an LED electrically coupled to said processor for providing a visual notification signal when the mail has arrived; and a speaker and an amplifier being connected to said processor for increasing a voltage level of an output signal associated with notifying the user that mail has arrived.

4. A wireless mail notification system for a mailbox that notifies a user whether mail has been delivered or retrieved after a door of the mailbox has been opened, said wireless mail notification system comprising:

a portable controller housed within a dwelling and spaced from the mailbox, said portable controller including a transceiver, wherein said portable controller is adaptable between on and off positions;

a stationary housing directly conjoined to support shaft of the mailbox, said stationary housing including a transceiver in wireless communication with said transceiver of said portable controller; and wireless means for generating a true notification signal and a false notification signal, respectively, when the door of the mailbox has been opened such that the user understands whether mail has been delivered or retrieved after the door of the mailbox is opened;

when said wireless means comprises a processor situated within said housing;

a timer circuit electrically and directly coupled to said processor, said timer circuit being triggered each time the door of the mailbox is opened wherein said timer circuit generates and transmits an instruction signal;

a motion sensor electrically and directly coupled to said processor, said motion sensor generating and transmitting a unique signal when a door of the mailbox is opened and motion is detected inside the mailbox and the door of the mailbox is closed; and a memory electrically coupled to said processor, said memory having software instructions that cause said wireless mail notification system to determine whether mail has been deposited into the mailbox or whether the door of the mailbox has been opened without depositing mail in the mailbox, said memory including software instructions performing a preprogrammed logic algorithm executing the steps of:

a. generating a first time signal when the door has been opened, b. generating a second time signal when mail has been placed into the mailbox, c. generating a third time signal when the door has been closed after mail is placed into the mailbox and after a predetermined time interval has lapsed since the mail was placed in the mailbox, d. calculating whether a sum of said first, second and third time signals is greater than said predetermined time interval, e. generating and transmitting a false notification signal to said transceiver housed with the dwelling if said sum time interval is less than said predetermined time interval, and f. generating and transmitting a true notification signal to said transceiver housed within the dwelling if said sum time interval is greater than said predetermined time interval;

wherein said processor is able to determine whether mail was deposited into the mailbox after the door of the mailbox was opened and whether mail was not deposited into the mailbox after the door of the mailbox was opened to thereby accurately notify the user when mail has truly arrived.

5. The system of claim 4, wherein said stationary housing further comprises:

an internal power source and a switch operably connected directly thereto, said switch being automatically adaptable between open and closed positions based upon said instruction signal received by said timer circuit;

an LED electrically coupled directly to said processor and being selectively illuminable when the door of the mailbox is opened; and a speaker and an amplifier directly and electrically coupled to said processor wherein said amplifier intensifies said true and false notification signals before reaching said speaker so that the stationary housing provides an audible alert signal at the mailbox while said portable controller alerts the user inside the dwelling, said LED and said speaker being independently and simultaneously operable.

6. The system of claim 4, wherein said portable controller further comprises:

a processor;

a memory electrically coupled to said processor, said memory including software instructions that cause said portable controller to automatically discontinue said audible signal when the mail has been retracted from the mailbox;

an LED electrically coupled to said processor for providing a visual notification signal when the mail has arrived; and a speaker and an amplifier being connected to said processor for increasing a voltage level of an output signal associated with notifying the user that mail has arrived.

7. A wireless mail notification system for a mailbox that notifies a user whether mail has been delivered or retrieved after a door of the mailbox has been opened, said wireless mail notification system comprising:

a portable controller housed within a dwelling and spaced from the mailbox, said portable controller including a transceiver, wherein said portable controller is adaptable between on and off positions;

a stationary housing directly conjoined to support shaft of the mailbox, wherein said stationary housing is mounted exterior of the mailbox, said stationary housing including a transceiver in wireless communication with said transceiver of said portable controller; and wireless means for generating a true notification signal and a false notification signal, respectively, when the door of the mailbox has been opened such that the user understands whether mail has been delivered or retrieved after the door of the mailbox is opened;

when said wireless means comprises a processor situated within said housing;

a timer circuit electrically and directly coupled to said processor, said timer circuit being triggered each time the door of the mailbox is opened wherein said timer circuit generates and transmits an instruction signal;

a motion sensor electrically and directly coupled to said processor, said motion sensor generating and transmitting a unique signal when a door of the mailbox is opened and motion is detected inside the mailbox and the door of the mailbox is closed; and a memory electrically coupled to said processor, said memory having software instructions that cause said wireless mail notification system to determine whether mail has been deposited into the mailbox or whether the door of the mailbox has been opened without depositing mail in the mailbox, said memory including software instructions performing a preprogrammed logic algorithm executing the steps of:

a. generating a first time signal when the door has been opened, b. generating a second time signal when mail has been placed into the mailbox, c. generating a third time signal when the door has been closed after mail is placed into the mailbox and after a predetermined time interval has lapsed since the mail was placed in the mailbox, d. calculating whether a sum of said first, second and third time signals is greater than said predetermined time interval, e. generating and transmitting a false notification signal to said transceiver housed with the dwelling if said sum time interval is less than said predetermined time interval, and f. generating and transmitting a true notification signal to said transceiver housed within the dwelling if said sum time interval is greater than said predetermined time interval;

wherein said processor is able to determine whether mail was deposited into the mailbox after the door of the mailbox was opened and whether mail was not deposited into the mailbox after the door of the mailbox was opened to thereby accurately notify the user when mail has truly arrived.

8. The system of claim 7, wherein said stationary housing further comprises:

an internal power source and a switch operably connected directly thereto, said switch being automatically adaptable between open and closed positions based upon said instruction signal received by said timer circuit;

an LED electrically coupled directly to said processor and being selectively illuminable when the door of the mailbox is opened; and a speaker and an amplifier directly and electrically coupled to said processor wherein said amplifier intensifies said true and false notification signals before reaching said speaker so that the stationary housing provides an audible alert signal at the mailbox while said portable controller alerts the user inside the dwelling, said LED and said speaker being independently and simultaneously operable.

9. The system of claim 7, wherein said portable controller further comprises:

a processor;

a memory electrically coupled to said processor, said memory including software instructions that cause said portable controller to automatically discontinue said audible signal when the mail has been retracted from the mailbox;

an LED electrically coupled to said processor for providing a visual notification signal when the mail has arrived; and a speaker and an amplifier being connected to said processor for increasing a voltage level of an output signal associated with notifying the user that mail has arrived.

* * * * *